(12) United States Patent
Messing

(10) Patent No.: US 11,668,281 B2
(45) Date of Patent: Jun. 6, 2023

(54) METHOD FOR DESIGNING AND OPERATING A WIND POWER INSTALLATION, WIND POWER INSTALLATION AND WIND FARM

(71) Applicant: Wobben Properties GmbH, Aurich (DE)

(72) Inventor: Ralf Messing, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/318,392

(22) Filed: May 12, 2021

(65) Prior Publication Data

US 2021/0355912 A1 Nov. 18, 2021

(30) Foreign Application Priority Data

May 15, 2020 (DE) .......................... 102020113261.1

(51) Int. Cl.
*F03D 7/02* (2006.01)
*F03D 7/04* (2006.01)

(52) U.S. Cl.
CPC ........... *F03D 7/0224* (2013.01); *F03D 7/028* (2013.01); *F03D 7/0276* (2013.01); *F03D 7/0296* (2013.01); *F03D 7/048* (2013.01); *F05B 2270/101* (2013.01); *F05B 2270/1033* (2013.01); *F05B 2270/327* (2013.01);
(Continued)

(58) Field of Classification Search
CPC ...... F03D 7/0224; F03D 7/0276; F03D 7/028; F03D 7/0296; F03D 7/048; F05B 2270/101; F05B 2270/1033; F05B 2270/327; F05B 2270/328; F05B 2270/333; F05B 2270/335
See application file for complete search history.

(56) References Cited

U.S. PATENT DOCUMENTS

| 2012/0189444 A1 | 7/2012 | Haag |
| 2014/0093382 A1 | 4/2014 | Fuglsang |
| 2017/0314530 A1 | 11/2017 | Herrig et al. |

FOREIGN PATENT DOCUMENTS

| DE | 102015008813 A1 | 1/2017 |
| DE | 102013202881 A1 | 8/2018 |

(Continued)

OTHER PUBLICATIONS

DE 102018127804 A1 English Translation (Year: 2020).*
(Continued)

*Primary Examiner* — Viet P Nguyen
(74) *Attorney, Agent, or Firm* — Seed Intellectual Property Law Group LLP

(57) ABSTRACT

A method for designing and operating a wind power installation for generating electrical power from wind, wherein the wind power installation has an aerodynamic rotor with rotor blades of which the blade pitch angle can be adjusted, wherein the rotor blades are populated with a plurality of vortex generators between the rotor blade root and the rotor blade tip, characterized in that a radius position up to which the population with the vortex generators in the longitudinal direction of the respective rotor blade is carried out is determined depending on a sound power level to be set at a site of the wind power installation. A rotor blade of a wind power installation, to an associated wind power installation and to a wind farm.

18 Claims, 9 Drawing Sheets

(52) U.S. Cl.
CPC ... *F05B 2270/328* (2013.01); *F05B 2270/333* (2013.01); *F05B 2270/335* (2013.01)

(56) References Cited

FOREIGN PATENT DOCUMENTS

| | | |
|---|---|---|
| DE | 102018127804 A1 | 5/2020 |
| EP | 2944802 A1 | 11/2015 |
| WO | 2007/140771 A1 | 12/2007 |

OTHER PUBLICATIONS

Jonkman et al., *Definition of a 5-MW Reference Wind Turbine for Offshore System Development*, Technical Report, NREL/TP-500-38060, Feb. 2009, 75 pages.

* cited by examiner

METHOD FOR DESIGNING AND OPERATING A WIND POWER INSTALLATION, WIND POWER INSTALLATION AND WIND FARM

BACKGROUND

Technical Field

The present disclosure relates to a method for designing and operating a wind power installation for generating electrical power from wind, wherein the wind power installation has an aerodynamic rotor with rotor blades of which the blade angle can be adjusted, wherein the rotor blades are populated with a plurality of vortex generators between the rotor blade root and the rotor blade tip. Furthermore, the present disclosure relates to a rotor blade of a wind power installation, to a wind power installation and to a wind farm.

Description of the Related Art

In order to influence the aerodynamic properties of rotor blades, it is known to provide, on the cross-sectional profile of the rotor blades, vortex generators which comprise a plurality of swirl elements running perpendicularly in relation to the surface. The vortex generators serve for generating local regions of turbulent air flows over the surface of the rotor blade in order to effect an increase in the resistance to flow separation. For this purpose, vortex generators swirl the flow close to the surface of the rotor blade, as a result of which the exchange of momentum between flow layers close to the surface and remote from the surface is greatly increased and the flow speeds in the boundary layer close to the surface increase.

Against the background of cost-optimized manufacture, a rotor blade is generally fitted with vortex generators in a standardized manner, that is to say is populated with vortex generators in the same way for each site.

Wind power installations are subject to a wide variety of environmental conditions depending on their site; in particular, the characteristics of the wind field to which the wind power installations are exposed during diurnal and seasonal changes may differ greatly. The wind field is characterized by a large number of parameters. The most important wind field parameters are average wind speed, turbulence, vertical and horizontal shear, change in wind direction over height, oblique incident flow and air density.

Wind power installations may also be subject to different general conditions depending on their site. These may be, for example, provisions such as permitted noise level distance from ambient noise or a sound power level which is generated by the wind power installation at a specific distance from the wind power installation during operation that must not be exceeded. For example, sound power level requirements of 5 to 6 dB (decibels) in relation to ambient noise during part-load operation of a wind power installation apply in France.

In order to reduce the sound power level, the wind power installations are generally operated at a reduced rated rotor speed, i.e., both with a reduced part-load speed and also with a reduced rated load speed, in comparison to the power-optimized operating mode in a sound-reduced operating mode. In order to avoid the threat of flow separation in particular in the central region of the rotor blade, which flow separation would otherwise lead to large power losses, the blade pitch angle, which is usually also called the pitch angle, is increased starting from a defined power.

DE 10 2018 127 804 A1 relates to a method for controlling a wind turbine. The method involves measuring noise emission by means of at least one pressure sensor attached to the rotor blade; recognizing a characteristic aeroacoustic sound for at least one flow detachment on the basis of the noise emission; and controlling, in open- or closed-loop fashion, one or more components of the wind turbine on the basis of the recognition of the characteristic aeroacoustic sound of the flow detachment.

DE 10 2015 008 813 A1 relates to a method for operating a wind power plant with at least one rotor blade which is mounted on a rotor and at least one vortex generator arranged on a rotor blade outer skin is displaced during operation.

DE 10 2013 202 881 A1 relates to a method for calculating a trailing edge that is to be produced for a rotor blade of an aerodynamic rotor of a wind power installation, wherein the rotor blade has radial positions with respect to the rotor, the rotor blade has a local blade profile that is a function of the radial positions with respect to the rotor and the trailing edge has a jagged profile having a plurality of spikes, wherein each spike has a spike height and a spike width, and the spike height and/or the spike width is calculated as a function of the radial position thereof and/or as a function of the local blade profile of the radial position thereof.

US 2017/0314530 A1 relates to a wind turbine blade assembly including a rotor blade having exterior surfaces defining a pressure side, a suction side, a leading edge and a trailing edge, each extending between a blade tip and a root. The rotor blade additionally defining a span and a chord. The blade assembly further includes a plurality of micro boundary layer energizers positioned on a surface of the pressure side of the rotor blade. The plurality of micro boundary layer energizers extending one of above or below a neutral plane of the rotor blade. The micro boundary layer energizers are shaped and positioned chordwise to delay separation of a boundary layer at a low angle of attack. A wind turbine including the blade assembly is additionally disclosed.

US 2014/0093382 A1 relates to a wind turbine rotor blade that includes a root portion, an airfoil portion, a thickened zone extending outward from an inner hub end of the blade into the airfoil portion of the blade; and an airflow correction arrangement arranged on a pressure side of the blade over at least a portion of the thickened zone. The airflow correction arrangement includes a spoiler to increase blade lift and a vortex generator arranged between a leading edge and the trailing edge and realized to maintain an attached airflow between the vortex generator and the spoiler. A wind turbine with at least one such rotor blade is disclosed. An airflow correction arrangement for correcting the airflow over the pressure side of a wind turbine rotor blade for a region of the blade having a thickened zone is further disclosed.

US 2012/0189444 A1 relates to a wind turbine blade comprising one or more turbulence generating strips, where the strips are placed on a surface of the blade. The blade is characterized in that at least one joint area of the turbulence generating strips and the surface of the blade are completely or partially covered by sealing means. The reference further relates to a pitch controlled wind turbine comprising at least two pitch controlled wind turbine blades and pitch controlling means for pitching the blades. The pitch controlled wind turbine is characterized in that the blades comprises one or more turbulence generating strips, wherein at least one joint area of the turbulence generating strips and a surface of the blades completely or partially covered by sealing means.

BRIEF SUMMARY

Provided is a method for designing and operating a wind power installation that is distinguished by more efficient operation of the wind power installation, but also to specify a rotor blade, a wind power installation and a wind farm which allow more efficient operation.

Proposed is a method for designing and operating a wind power installation for generating electrical power from wind, wherein the wind power installation has an aerodynamic rotor with rotor blades of which the blade pitch angle can be adjusted, wherein the rotor blades are populated with a plurality of vortex generators between the rotor blade root and the rotor blade tip at radius positions in the longitudinal direction. Improving the efficiency of operation of the wind power installation is achieved in that a radius position up to which the population with the vortex generators in the longitudinal direction of the respective rotor blade is carried out is determined depending on a sound power level to be set at a site of the wind power installation.

The sound power level to be set is selected in such a way that the wind power installation meets sound power level requirements at the site of the wind power installation. The population of the rotor blade as far as a radius position which is situated further on the outside in the longitudinal direction of the respective rotor blade allows a smaller blade pitch angle to be provided during operation of the wind power installation, in order to prevent flow separation. As a result, the wind power installation can be operated at a rated rotor speed that is reduced in comparison to a power-optimized operating mode and with a higher power coefficient in a sound-reduced operating mode. This can make it possible to increase the annual energy production of the wind power installation. The increase in the annual energy production may lie in the region of a few percent, for example 2% to 4%.

According to the disclosure, it is therefore proposed to provide adapted population with the vortex generators on the respective rotor blade at a site with a relatively low permitted sound power level, in order to prevent the occurrence of flow separation on account of the relatively low rated rotor speed in the sound-reduced operating mode in comparison to prior population of a rotor blade with the vortex generators independently of the site. The vortex generators can increase the maximum angle of attack at which a stall occurs. A population of the rotor blade with vortex generators depending on the site, i.e., in a non-standardized manner, can lead to increased production which, overall, may possibly considerably overcompensate for the savings made in respect of production in the case of population independently of the site.

The operation of the wind power installation at a relatively low rated rotor speed leads to a relatively low sound power level of the wind power installation. However, a relatively low rated rotor speed also leads to an increase in the local angle of attack along the rotor blade. In order to limit the angle of attack and to avoid flow separation on the rotor blade, the blade pitch angle is adapted. Adapting the blade pitch angle, in particular setting relatively large blade pitch angles, can lead to significant production losses. The angles of attack at the transition between a region of the rotor blade with vortex generators and a region of the rotor blade without vortex generators are typically critical for setting the blade pitch angle. In many cases, a risk of flow separation is greater in the regions facing the hub than in the outer blade and production potential is present in the outer blade. Extending the population with vortex generators up to the blade tip while at the same time adapting blade pitch angle management, in particular reducing the blade pitch angle, may increase the annual energy production (AEP).

In the method, the blade pitch angle of the rotor blades with which the wind power installation is operated is additionally preferably determined depending on the sound power level to be set at the site of the wind power installation. The method can provide that both the blade pitch angle of the rotor blades with which the wind power installation is operated and also the radius position up to which the population with the vortex generators in the longitudinal direction of the respective rotor blade is carried out are determined depending on the sound power level to be set at the site of the wind power installation. This can make it possible to match the population of the rotor blade and the setting of the blade pitch angle to one another in order to increase the annual energy production while complying with the sound power level requirements.

In a sound-reduced operating mode, the wind power installation can be operated at a rated rotor speed that is reduced in comparison to a power-optimized operating mode, depending on the sound power level to be set at the site of the wind power installation. This can make it possible to increase the annual energy production while complying with the sound power level requirements.

Reducing the blade pitch angle can, in turn, lead to an increased sound power level. The rated rotor speed can be reduced in such a way that the sound power level to be set is achieved taking into account the reduced blade pitch angle and the population of the rotor blades with vortex generators. The optimum combination of blade pitch angle and speed can be achieved here iteratively or by optimization methods under the boundary condition of the sound power level to be set and can level out as it were.

The method can also, for example, determine that no vortex generators are advantageous for a specific rotor blade up to a predetermined sound power level to be set and population with vortex generators is introduced only when sound power levels to be set drop below the predetermined sound power level.

The population with vortex generators can begin immediately at the rotor blade root or at a position at a distance from the rotor blade root in the longitudinal direction. It is crucial for success of the disclosure that the population ends in the radius position determined according to the disclosure depending on the sound power level to be set. Continuous or constant population with vortex generators must not be performed either, that is to say that interruptions in the population are also possible.

In the case of passive elements for influencing flow in the form of vortex generators, "population" is to be understood to mean, in particular, fitting such elements to or on the rotor blade. In the case of active elements for influencing flow, "population" can be understood to mean, in particular, the activation or deactivation of such elements, but also fitting of said elements to or on the rotor blade. Active elements for influencing flow comprise slots or openings for drawing in and/or blowing out air, controllable flaps and the like. For example, vortex generators in the form of plasma generators can also be used for generating turbulence.

Combinations of active and passive elements for influencing flow can particularly preferably be used as vortex generators. Therefore, in this case, passive vortex generators can be used, for example, in an inner region close to the rotor blade root, while active vortex generators can be used in a region which is situated further on the outside. Therefore, the radius position, up to which the rotor blade is populated with vortex generators, can also be varied during ongoing operation by controlling the active elements for influencing flow and can be matched, in particular, to the environmental conditions, for example the air density, or modified general conditions, in particular modified sound power level requirements. At the same time, the complexity of design in comparison with exclusively active vortex generators is kept low owing to the comparatively small proportion of active vortex generators.

The air density is not constant and varies over time. Therefore, an average value, for example an annual average of the air density, or else a minimum annual air density is preferably used as a value for the air density. As an alternative or in addition, the geographical height of the site can be included, this having an influence on the air density, as is known. The air density is then preferably calculated from the geographical height and, for example, an average temperature at the site.

Sound power level requirements which determine the sound power level to be set that must not be exceeded may also change at a site over time. For example, different sound power level requirements may apply at different times, for example at night and during the day or at specific rest times.

The radius position represents the position on a rotor blade along the rotor blade longitudinal axis as the radius of the respective position with respect to an outside radius of the rotor or represents a rotor blade length. The two reference variables outside radius and rotor blade length differ by half the diameter of the rotor blade hub, which may have to be subtracted.

As a result, the relevant position on the rotor blade as the radius position can be indicated by a value in the range of from 0 (zero) to 1 (one). The reason for using the radius for describing a position along the rotor blade is that rotor blades are intended to be mounted on a rotor of a wind power installation in order to fulfil their intended use. Therefore, rotor blades are always permanently associated with a rotor, and therefore the radius is used as a reference variable. The radius position preferably has the value 0 (zero) at the center point of the rotor, that is to say in the rotor rotation axis. The radius position preferably has the value 1 (one) at the blade tip which characterizes the point of the rotor situated furthest on the outside.

Determining the radius position at which the vortex generators end and the blade pitch angle of the rotor blades with which the wind power installation is operated can preferably be performed depending on the sound power level to be set in such a way that flow separation to be expected on account of the reduced rated rotor speed is prevented and a power loss to be expected is minimized. This makes it possible to ensure that no flow separation occurs on the rotor blade. As a result, a power loss can be minimized. Owing to the site-specific design of the arrangement of the vortex generators, which design is dependent on the sound power level to be set, the occurrence of flow separation can be switched to significantly reduced blade pitch angles. This makes it possible to operate the rotor blade in an optimized angle of attack range.

The population with the vortex generators can be carried out in the longitudinal direction of the respective rotor blade up to a radius position which is determined depending on the reduced rated rotor speed.

In a preferred development, determining the radius position up to which the population with the vortex generators in the longitudinal direction of the respective rotor blade is carried out is performed depending on the sound power level to be set in such a way that an increase in the blade pitch angle, which increase is necessary in the case of a relatively low sound power level to be set and is caused by a necessary reduction in the rated rotor speed, is compensated for. The increase in the blade pitch angle or pitch angle can therefore be reduced or even entirely avoided.

Determining the radius position at which the vortex generators end and the blade pitch angle of the rotor blades with which the wind power installation is operated can be performed depending on the sound power level to be set in such a way that, during hybrid operation containing operating time periods in the power-optimized operating mode and in the sound-reduced operating mode, production losses in the power-optimized operating mode are at least compensated for by production gains in the sound-reduced operating mode over a specific time period.

Population with vortex generators up to a relatively large radius position can lead to production losses in the power-optimized operating mode. These production losses can be compensated or overcompensated for by production gains in the sound-reduced operating mode, so that greater production, e.g., greater annual energy production, can be achieved in a specific time period overall during hybrid operation. The method can therefore also provide that the production losses in the power-optimized operating mode can be overcompensated for by production gains in the sound-reduced operating mode over a specific time period, for example one year, so that, for example, greater annual energy production is achieved by adapting the population with vortex generators and the blade pitch angle of the rotor blades than without such adaptation. A reduction in the annual energy production of the power-optimized operating mode by the population of the rotor blade up to a radius position which is situated further on the outside in the longitudinal direction of the respective rotor blade is typically low in comparison to increasing the annual energy production of the sound-reduced operating mode, and therefore the production loss in the power-optimized operating mode can be compensated or overcompensated for by the production gain in the sound-reduced operating mode overall.

The method can provide, for example, hybrid operation if different sound power level requirements apply at the site of the wind power installation during the day and at night or at specific rest times. For example, the wind power installation can be operated in the power-optimized operating mode during the day when less stringent sound power level requirements apply and in the sound-reduced operating mode at night when more stringent sound power level requirements apply.

In the power-optimized operating mode, the wind power installation is operated at a power-optimized rated rotor speed in order to generate a power-optimized rated power. In the sound-reduced operating mode, the wind power installation is operated at a rated rotor speed which is reduced in comparison to the power-optimized operating mode, in order to satisfy the sound power level requirements. The sound-reduced operating mode generates a rated power which is reduced in comparison to the power-optimized rated power. The annual energy production of the wind power installation depends, amongst other things, on the time period for which the wind power installation is operated in the power-optimized operating mode and the time period for which the wind power installation is operated in the sound-reduced operating mode. During hybrid operation, the wind power installation can also be operated in further part-load operating modes in addition to the sound-reduced operating mode.

Different sound power level requirements exist at different sites, for example sound power level requirements can exist to the effect that reduced sound power levels already have to be complied with in a part-load range or shortly before the rated power is reached. Accordingly, the sound power level to be set then has to be selected in order to satisfy the sound power level requirements.

Setting the blade pitch angle can preferably be carried out depending on the radius position determined for the population with the vortex generators. As a result, an optimum design can be ensured.

The method can provide that a parameter can be iteratively optimized depending on the rated rotor speed, blade pitch angle of the rotor blades and radius position up to which the population with the vortex generators is carried out in the longitudinal direction of the respective rotor blade under the boundary condition that the wind power installation emits a sound power level which is below or equal to the sound power level to be set, until a boundary condition is satisfied. The parameter may be, for example, a production quantity generated by the wind power installation in a certain time period, for example annual energy production of the wind power installation. The boundary condition may be, for example, reaching a maximum number of iteration steps or a convergence condition. The convergence condition may be, for example, that the difference between annual energy production established in two successive iteration steps is lower than a prespecified limit value. This can make it possible to match the rated rotor speed, the blade pitch angle of the rotor blades and the radius position up to which the population with the vortex generators is carried out in the longitudinal direction of the respective rotor blade to one another such that maximum annual energy production is achieved taking into account the sound power level requirements.

The population of the rotor blade with the vortex generators can preferably be carried out taking into account specific operational management, in particular a specific rated power at which the wind power installation at one site is operated. In respect of operational management, it is conceivable to provide site- and sound power level-dependent rated powers for a wind installation type. For this purpose, adapting the rated power can be implemented by adapting the rated rotor speed. The operation of the wind power installation at the respective rated rotor speeds and rated powers can depend on changing general conditions.

For example, the wind power installation can be operated at a reduced rated rotor speed in a sound-reduced operating mode in order to comply with sound power level requirements. If the sound power level requirements do not limit the rated rotor speed of the wind power installation, the wind power installation can be operated at a relatively high rated rotor speed during power-optimized operation. Relatively high rated rotor speeds can, in particular depending on the ratio of rated rotor speed and rated power, lead to relatively high tip speed ratios in the region of the rated power and therefore to reduced angles of attack, and consequently the risk of flow separation is reduced. In return, this leads to the population with vortex generators in the radial direction being able to be reduced, and this can lead to less noise or a lower sound power level and to increases in power.

The tip speed ratio is defined as the ratio of a speed of the rotor blade tip at the rated rotor speed to the rated wind speed when the rated power is reached in the respective operating mode. The tip speed ratio accordingly depends on the ratio of the rated rotor speed and the rated power. By way of the rated rotor speed and/or the rated power changing, a relatively high or relatively low tip speed ratio can accordingly result. It may be advantageous to populate wind power installations of an installation type which are operated at different rated powers with vortex generators to different extents in the radial direction. In particular during hybrid operation, the population with vortex generators can depend on how high the respective proportions of the power-optimized operating mode and of the sound-reduced operating mode in a production time period of the wind power installation are.

According to a preferred development, a plurality of blade setting characteristic curves can be stored and one blade setting characteristic curve can be selected from amongst the stored blade setting characteristic curves depending on the radius position determined for the population with the vortex generators and can be used for setting the blade pitch angle.

The wind power installation can be operated at a rated rotor speed depending on the site. Determining the radius position up to which the respective rotor blade is populated with vortex generators in the longitudinal direction of the respective rotor blade can be determined depending on the rated rotor speed.

The radius position up to which the population with the vortex generators in the longitudinal direction of the respective rotor blade is carried out is determined depending on a proportion of a sound-reduced operating mode at the site of the wind power installation.

Wind power installations are usually not intended to be operated in the sound-reduced operating mode for the entire year, but rather, for example, only for a specific proportion which can fluctuate between 0 and 100% and can be readily determined for the site. Depending on the proportion in which the wind power installation is intended to be operated in the sound-reduced operating mode, different optimum populations with vortex generators result. Therefore, the annual energy production (AEP) can be maximized in spite of sound-reduced operation.

Here, it is additionally possible for different sound-reduced operating modes, such as strictly limited and less strictly limited, for example limited to 98 dB and to 100 dB, to be combined. The limitations of different extents to the sound-reduced operating modes can be incorporated into determining the proportion of the sound-reduced operating mode with different degrees of importance, wherein less strict limitations receive a lower weighting.

Operational management of the wind power installation, in particular setting the blade pitch angle, is preferably additionally determined depending on the proportion of the sound-reduced operating mode at the site of the wind power installation.

It has been found that both the optimum population of the rotor blade and also the associated optimized operational management can optimize the annual energy production depending on the proportion of the sound-reduced operating mode.

According to a second aspect, the disclosure furthermore relates to a rotor blade having a suction side and a pressure side, wherein a plurality of vortex generators are arranged at least on the suction side between the rotor blade root and the rotor blade tip, wherein arranging the vortex generators in the longitudinal direction of the respective rotor blade up to a radius position is performed depending on a site-specific sound power level to be set. The population of the respective rotor blade with vortex generators depending on a site-specific sound power level makes it possible to operate a wind power installation with the rotor blade at a sound power level which satisfies the site-specific sound power level requirements. The wind power installation can further be operated with a smaller blade pitch angle which prevents flow separation. This can lead to greater production.

In this case, arranging the vortex generators starting from the rotor blade root, in the direction of the rotor blade tip, up to the radius position of the rotor blade is performed in such a way that, during sound-reduced operation at a rated rotor speed that is reduced in comparison to power-optimized operation and with setting of a blade pitch angle of the rotor blade matched to the arrangement of the vortex generators, flow separation to be expected on account of the reduced rated rotor speed is prevented and a power loss to be expected is minimized.

It may therefore be advantageous to make provision for rotor blades of wind power installations of one installation type which have to satisfy different sound power level requirements to also be populated with vortex generators to different extents in the radial direction.

The present disclosure is particularly advantageous for rotor blades showing a certain geometry referred to as slender blades. Slender blades evolved in recent years in a trend to strongly increase rotor diameter while simultaneously decreasing the profile depth. In the context of the present disclosure, a slender blade is referred to as any blade having a higher design lift coefficient or a higher design tip speed ratio, TSR, when compared with an onshore or offshore version of the reference turbine disclosed in Jonkman, J. et al.: *Definition of a 5-MW Reference Wind Turbine for Offshore System Development*, Report, NREL/TP-500-38060, 2009. So slender blades are aerodynamically facilitated by an increase of design tip speed ratio and/or an improvement of the design lift coefficient.

It is known that such slender blades are highly influenced by the provision and layout of vortex generators.

It is in particular preferred to have a rotor blade geometry that experiences a low aerodynamic load near the rotor blade tip. A low aerodynamic load is in particular understood as comprising a predetermined load reserve difference, for instance 20% or 30% or any other suitable value, with regard to a theoretically maximum aerodynamic load. Thus, the available aerodynamic reserve can be used, using the arrangement and population of vortex generators according to the disclosure, to increase the energy output.

Preferentially, a region near the rotor blade tip is referred to as the outermost 20% in blade length, while also other definitions of the blade tip region can be contemplated.

Preferentially, it is preferred that an axial induction factor distribution near the blade tip presents sufficient distance to the Betz' limit, in particular is sufficiently smaller than Betz' limit. In the context of the present disclosure, it is preferred that a sufficient distance from Betz' limit applies if the axial induction factor is below 0.3, preferably below 0.2 and most preferably in the range of 0.1 to 0.15, while also other boundaries are feasible.

In a preferred embodiment, the rotor blade presents a declining aerodynamic load with increased radial position. Such rotor blade proved particularly efficient to be used with the present disclosure.

In a third aspect, the disclosure furthermore relates to a wind power installation comprising an aerodynamic rotor with rotor blades of which the blade pitch angle can be adjusted, wherein the rotor can be operated at a settable rated rotor speed, and a control system, characterized in that the control system is designed to operate the wind power installation in line with a method according to the first aspect or a refinement thereof.

The rotor can preferably have at least one rotor blade according to the second aspect.

In a fourth aspect, the disclosure furthermore also relates to a wind farm having a plurality of wind power installations according to the third aspect.

BRIEF DESCRIPTION OF THE SEVERAL VIEWS OF THE DRAWINGS

The disclosure will be described in more detail below with reference to one possible exemplary embodiment with reference to the appended figures, in which.

DETAILED DESCRIPTION

The explanation of the disclosure on the basis of examples with reference to the figures takes place in a substantially diagrammatic manner, and the elements which are explained in the respective figure can be exaggerated therein for improved illustration and other elements can be simplified. Thus, for example, FIG. 1 illustrates a wind power installation per se diagrammatically, with the result that an arrangement of vortex generators which is provided cannot be seen clearly.

Figure 1:
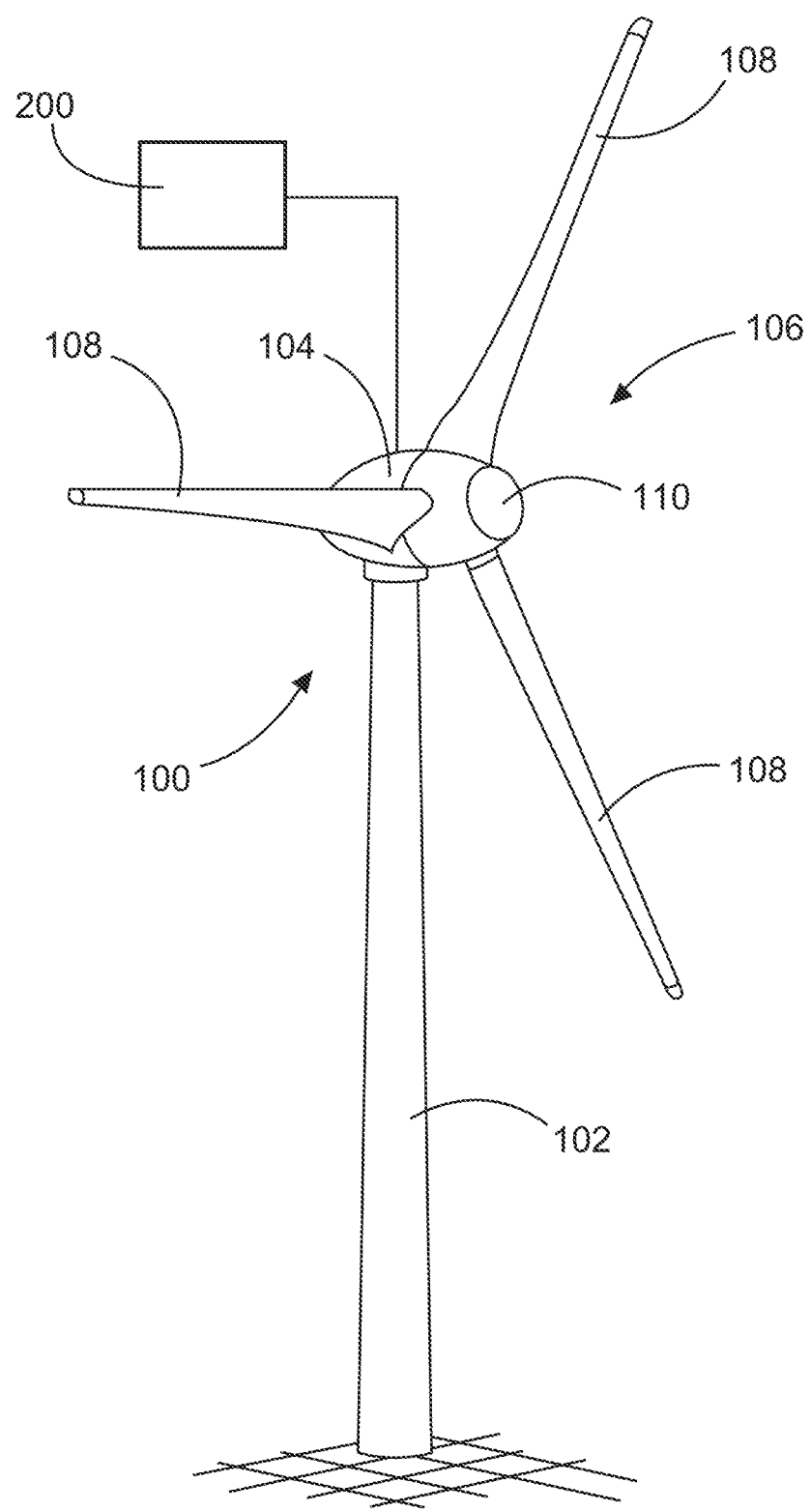
FIG. 1 shows a wind power installation according to the present disclosure.

FIG. 1 shows a wind power installation 100 with a tower 102 and a nacelle 104. A rotor 106 with three rotor blades 108 and a spinner is arranged on the nacelle 104. During operation, the rotor 106 is set in a rotational movement by way of the wind and, as a result, drives a generator in the nacelle 104. The blade angle of the rotor blades 108 can be set. The blade pitch angles γ of the rotor blades 108 can be changed by pitch motors which are arranged at rotor blade roots 114 (cf. FIG. 2) of the respective rotor blades 108. The rotor 106 is operated at a rated rotor speed n which can be set depending on the operating mode.

In this exemplary embodiment, the wind power installation 100 is controlled by a control system 200 which is part of a comprehensive control system of the wind power installation 100. The control system 200 is implemented, in general, as part of the control system of the wind power installation 100.

The wind power installation 100 can be operated in a power-optimized operating mode or a sound-reduced operating mode by means of the control system 200. In the power-optimized operating mode, the wind power installation 100 generates the optimum power that can be generated with the wind power installation 100. In the sound-reduced operating mode, the wind power installation 100 is operated at a rated rotor speed that is reduced in comparison to the power-optimized operating mode, in order to set a sound power level which is less than or equal to a sound power level prespecified by sound power level requirements.

A plurality of these wind power installations 100 may form part of a wind farm. The wind power installations 100 in this case are subject to a wide variety of environmental and general conditions, depending on their site. In particular, the sound power level requirements made of the wind power installation may differ depending on its site. Furthermore, the characteristics of the wind field to which the wind power installations are exposed during daily and seasonal changes may differ greatly. The wind field is characterized by a large number of parameters. The most important wind field parameters are average wind speed, turbulence, vertical and horizontal shear, change in wind direction over height, oblique incident flow and air density.

With a view to the sound power level to be set, one measure for operating a wind power installation provides for countering the increase in the angles of attack on the rotor blade, which increase is caused by the rated rotor speed that is reduced during sound-reduced operation, by way of increasing the blade pitch angle γ, which is also called the pitch angle, starting from a certain power in order to avoid the threat of flow separation in the central region of the rotor blade 108, which flow separation would lead to large power losses. This raising of the blade pitch angle γ in this case leads to power losses of the wind power installation 100, but these power losses in general turn out to be smaller than the power losses which would occur as a result of the flow separation occurring at the respective rotor blades 108.

Figure 2:
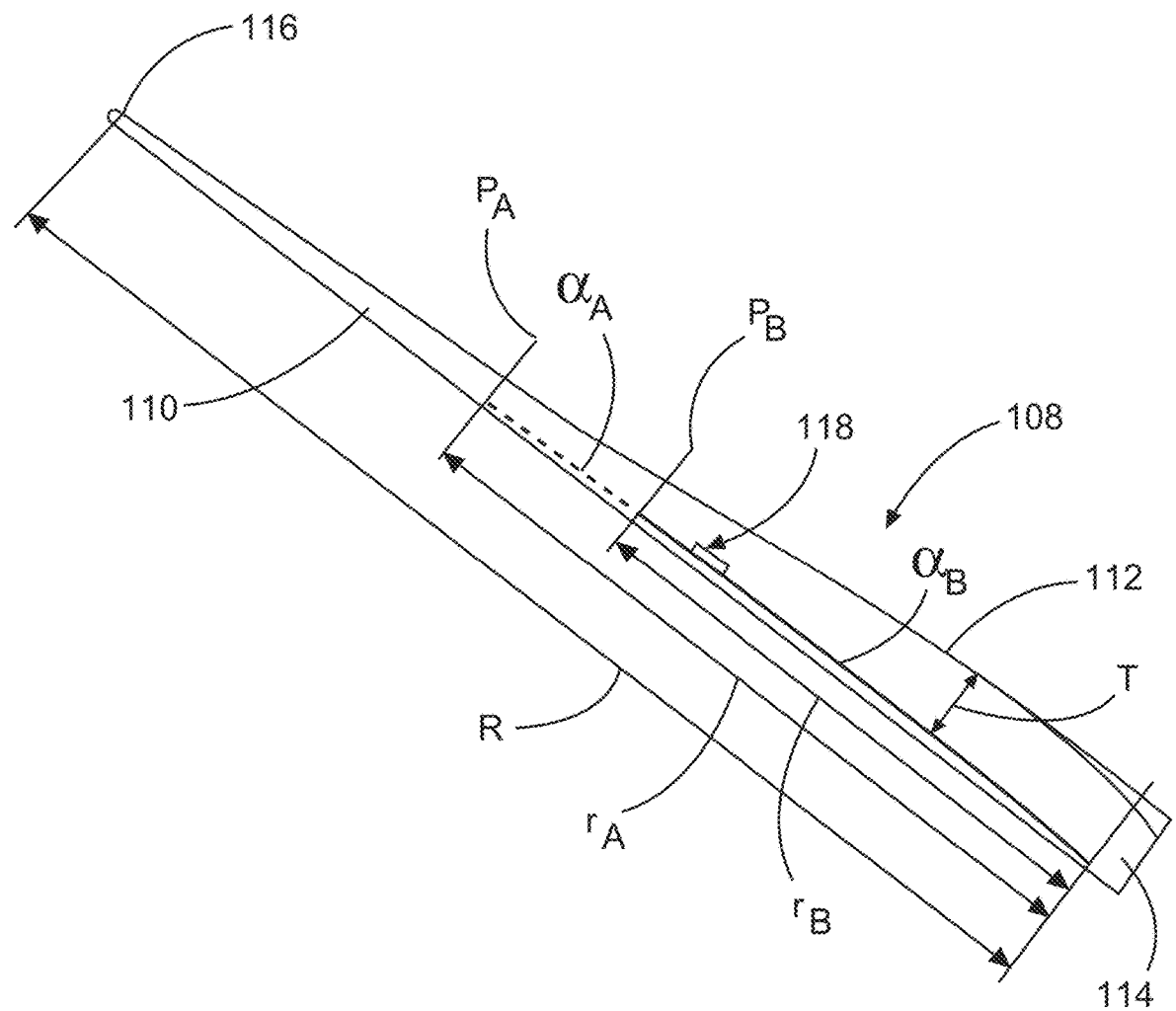
FIG. 2 shows a diagrammatic view of a single rotor blade.

According to the disclosure, it is now proposed to take into consideration a design of the population of vortex generators 118 on the rotor blade 108, which design is matched to a site with a relatively low sound power level to be set, as is illustrated in FIG. 2 by way of example. The vortex generators 118 which are fitted over an extended region in the central part of the rotor blade 108 depending on the sound power level to be set determined at a site of the wind power installation 100 prevent flow separation in the central part and as a result it is possible to reduce the raising of the blade pitch angle γ or to set a smaller blade pitch angle, and this can lead to greater production of the wind power installation 100 overall.

FIG. 2 shows a diagrammatic view of a single rotor blade 108 having a rotor blade leading edge 110 and a rotor blade trailing edge 112. The rotor blade 108 has a rotor blade root 114 and a rotor blade tip 116. The distance between the rotor blade root 114 and the rotor blade tip 116 is called the outside radius R of the rotor blade 108. The distance between the rotor blade leading edge 110 and the rotor blade trailing edge 112 is termed the profile depth T. At the rotor blade root 114 or, in general, in the region close to the rotor blade root 114, the rotor blade 108 has a large profile depth T. At the rotor blade tip 116, by contrast, the profile depth T is very much smaller. The profile depth T decreases significantly starting from the rotor blade root 114, in this example after an increase in the blade inner region, up to a middle region. A separation point (not illustrated here) may be provided in the middle region. From the middle region up to the rotor blade tip 116, the profile depth T is almost constant, or the decrease in the profile depth T is significantly reduced.

The illustration in FIG. 2 shows the suction side of the rotor blade 108. Vortex generators 118 are arranged on the suction side. Alternative refinements of the vortex generators 118 as active or passive elements for influencing flow are conceivable. Whereas the vortex generators 118 in the example illustrated are shown arranged on the suction side of the rotor blade 108, vortex generators 118 on the pressure side of the rotor blade 108 with the population according to the disclosure are possible as an alternative or else in addition. The population with the vortex generators 118 can take place in the region of the rotor blade leading edge 110 or else at another position between the rotor blade leading edge 110 and the rotor blade trailing edge 112. The extent of the population of the vortex generators 118 begins in the region of the rotor blade root 114 and runs in the direction of the rotor blade tip 116.

With respect to the rotor 106, the vortex generators 118 extend in the radial direction up to a position $P_A$ or $P_B$ on the rotor blade. In this case, the respective position $P_A$ or $P_B$ on the rotor blade 108 is specified as the radius position with respect to a standardized radius r/R. The radius position based on the standardized radius r/R represents the position on the rotor blade 108 along the rotor blade longitudinal axis as radius $r_a$, $r_b$ of the respective position $P_A$, $P_B$ with respect to the outside radius R of the rotor 108 or represents the rotor blade length. As a result, the relevant position $P_A$ or $P_B$ on the rotor blade 108 as the radius position r/R can be indicated by a value in the range of from 0 (zero) to 1 (one).

In order to increase the annual energy production of the wind power installation 100 which uses the rotor blade 108, the vortex generators 118 are arranged in the longitudinal direction of the rotor blade 108 up to a radius position r/R depending on the site-specific sound power level to be set. Arranging the vortex generators 118 starting from the rotor blade root 114, in the direction of the rotor blade tip 116, up to the radius position r/R of the rotor blade 108 is performed in such a way that, in the sound-reduced operating mode at the rated rotor speed that is reduced in comparison to the power-optimized operating mode and with setting of the blade pitch angle γ of the rotor blade 108 matched to the arrangement of the vortex generators 118, flow separation to be expected on account of the reduced rated rotor speed is prevented and a power loss to be expected is minimized.

Figure 3:
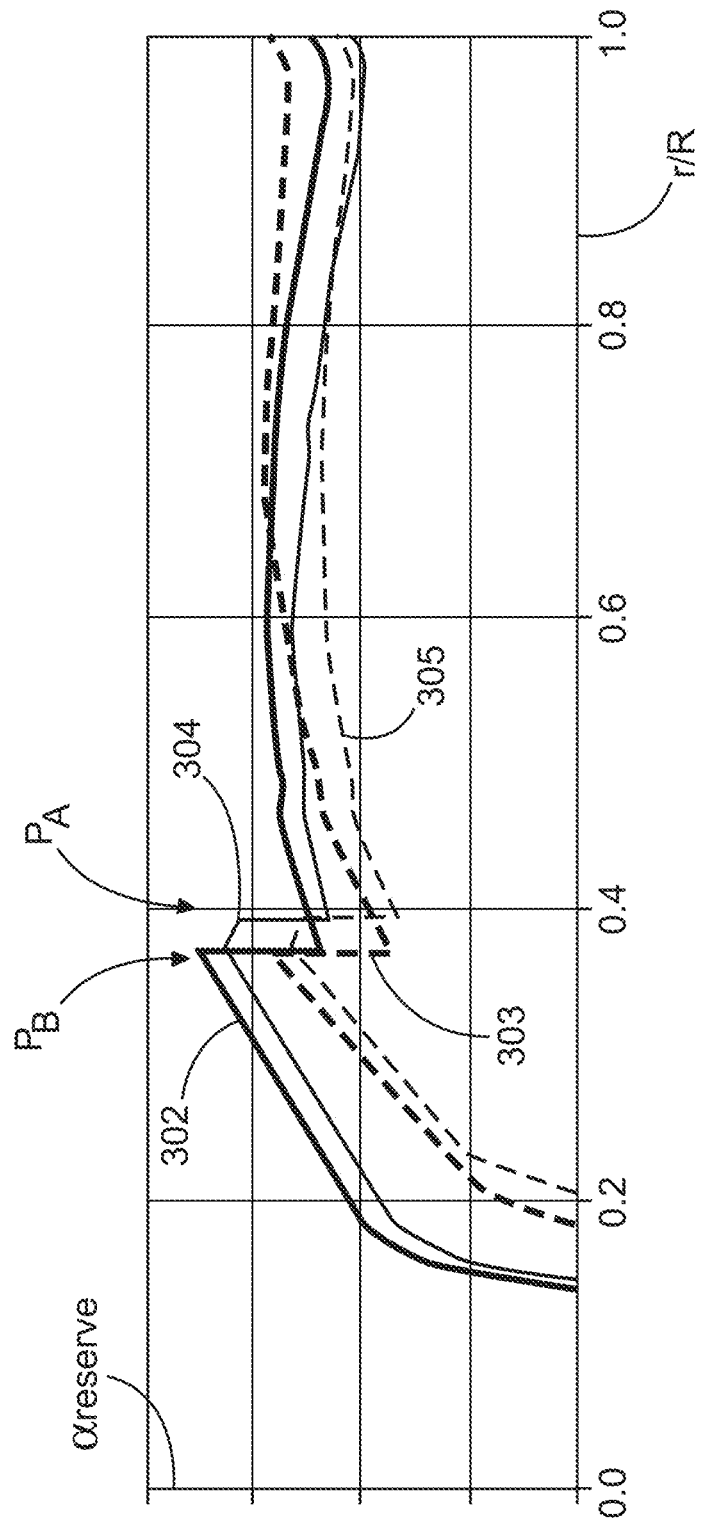
FIG. 3 shows, by way of example, different curves for an angle of attack reserve on the rotor blade over the standardized rotor radius for two different operating situations.

FIG. 3 shows, for two exemplary, different operating situations (case A and case B) which are listed in the following table, different curves 302, 303 (case B) and 304, 305 (case A) of an angle of attack reserve $\alpha_{reserve}$ on the rotor blade 108 over the radius position r/R. The operating situations case A and case B differ from one another in respect of the radius position $r_A$, $R_B$ up to which the rotor blade 108 is populated with vortex generators 118 or the position $P_A$, $P_B$ of the population of the rotor blade 108 with vortex generators 118 and a blade pitch angle characteristic curve 602 (case B) and 604 (case A) selected for operation (cf. FIG. 6).

The end point of the population with vortex generators 118 in the longitudinal direction of the rotor blade 108 is evident by way of a sudden drop in the angle of attack reserve in the graph of FIG. 3.

The angle of attack reserve is dependent on the wind speed; the curves 302, 304 are shown for an exemplary wind speed of 6 m/s, whereas the curves 303, 305 show the curves for that wind speed at which the smallest angle of attack reserve is present. The wind speeds on which the curves 303 and 305 are based do not have to be and also with great probability are not identical in practice since the arrangement of the vortex generators 118 has a considerable influence on the wind speed dependence of the angle of attack reserve.

In both cases A and B, the wind power installation 100 is subject to the same sound power level requirements, and therefore, both in case B and in case A, the operating parameters of the wind power installation 100, in particular rated rotor speeds in the sound-reduced operating mode, blade pitch angles of the rotor blades and radius position up to which the rotor blade 108 is populated with vortex generators 118, are selected in such a way that they emit a sound power level to be set which is equal to or less than a sound power level according to the sound power level requirements.

| Table of operating situations: | |
| --- | --- |
| Case B | Vortex generators up to $r_B$, blade pitch angle characteristic curve $P_B$ |
| Case A | Vortex generators up to $r_A$, blade pitch angle characteristic curve $P_A$ |

In case B, the vortex generators are arranged up to the position $P_B$ and the wind power installation is operated with the blade pitch angle characteristic curve 602. The combination of population with vortex generators and blade pitch angles γ makes it possible to obtain an adequate angle of attack reserve over the entire length of the rotor blade and therefore to avoid stalls.

Case A describes the case according to which more reliable operation with the preferred blade pitch angle characteristic curve 604 is possible without stalls occurring, owing to the change in the position at which the vortex generators end, specifically at the position $P_A$. The blade pitch angles γ of the blade pitch angle characteristic curve 604 are smaller than the blade pitch angles γ of the blade pitch angle characteristic curve 602 (cf. FIG. 6). This makes it possible to generate a greater power (cf. FIG. 5) and therefore to obtain greater annual energy production (cf. FIG. 7) overall. In particular, the wind power installation can be operated with a higher power coefficient in case A than in case B (cf. FIG. 8).

Therefore, a method for designing and operating a wind power installation, for example the wind power installation 100 from FIG. 1 with rotor blades 108 which are populated with vortex generators 118, as are shown in FIG. 2, for generating electrical power from wind are provided for case A. A radius position r/R up to which the population with the vortex generators 118 in the longitudinal direction of the respective rotor blade 108 is carried out is determined depending on a sound power level to be set at a site of the wind power installation 100. In addition, the blade pitch angle γ of the rotor blades 108 with which the wind power installation 100 is operated can be determined depending on the sound power level to be set at the site of the wind power installation 100. In the sound-reduced operating mode, the wind power installation 100 can be operated at a rated rotor speed that is reduced in comparison to the power-optimized operating mode depending on the sound power level to be set at the site of the wind power installation 100.

Determining the radius position r/R at which the vortex generators 118 end and the blade pitch angle γ of the rotor blades 108 with which the wind power installation 100 is operated can also be performed depending on the sound power level to be set in such a way that flow separation to be expected on account of the reduced rated rotor speed is prevented and a power loss to be expected is minimized.

The population with the vortex generators 118 can be carried out in the longitudinal direction of the respective rotor blade 108 up to the radius position r/R which is determined depending on the reduced rated rotor speed.

Determining the radius position r/R up to which the population with the vortex generators 118 in the longitudinal direction of the respective rotor blade 108 is carried out can also be performed depending on the sound power level to be set in such a way that an increase in the blade pitch angle γ, which increase is necessary in the case of a relatively low sound power level to be set and is caused by a necessary reduction in the rated rotor speed, is minimized.

Furthermore, determining the radius position r/R at which the vortex generators 118 end and the blade pitch angle γ of the rotor blades 108 with which the wind power installation 100 is operated can be performed depending on the sound power level to be set in such a way that, during hybrid operation containing operating time periods in the power-optimized operating mode and in the sound-reduced operating mode, production losses in the power-optimized operating mode are at least compensated for by production gains in the sound-reduced operating mode over a specific time period.

Setting the blade pitch angle γ can be carried out depending on the radius position r/R determined for the population with the vortex generators 118.

The population of the rotor blades 108 with the vortex generators 118 can be carried out taking into account specific operational management, in particular a specific rated power at which the wind power installation 100 at one site is operated. Here, the rated powers can be taken into account during hybrid operation or the reduced rated power can be taken into account in the sound-reduced operating mode.

A plurality of blade setting characteristic curves can be stored, for example in the control system 200. One blade setting characteristic curve can be selected from amongst the stored blade setting characteristic curves depending on the radius position r/R determined for the population with the vortex generators 118 and can be used for setting the blade pitch angle γ.

Figure 4:
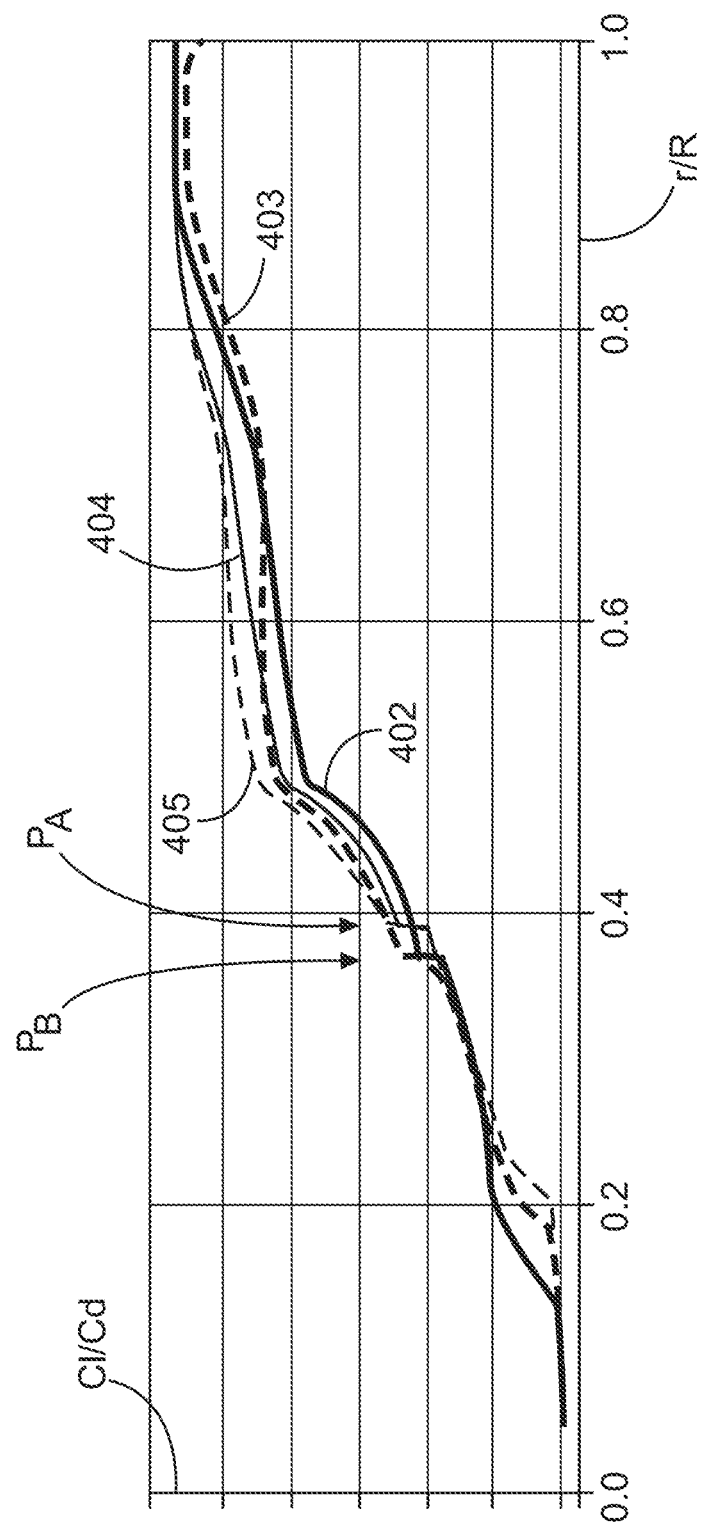
FIG. 4 shows exemplary curves of the lift-to-drag ratio for the different operating situations of the wind power installation.

FIG. 4 illustrates exemplary curves 402, 403 and 404, 405 of the lift-to-drag ratio for the two different operating situations case B and case A. The curves 402, 403 are established for case B. The curves 404, 405 are established for case A, wherein the respective curves are based on different wind speeds, just like in FIG. 3. The curves 402, 404 are shown for an exemplary wind speed of 6 m/s, whereas the curves 403, 405 show the curves for that wind speed at which the lowest angle of attack reserve is present.

For case B, it can be seen in the first instance that the lift-to-drag ratios according to the curve 402 up to a radius position r/R<0.37 are small and rise with a small jump starting from this radius position r/R and increase toward the outside to the rotor blade tip 116, to higher radius positions r/R>0.37. The low values for the lift-to-drag ratios in the curve 402 are due to the population with vortex generators 118 which generally lead to increased drag coefficients.

The curve 404 of the lift-to-drag ratio in case A is substantially qualitatively similar to the curve 402 up to the radius position r/R of approximately 0.37. However, the lift-to-drag ratio is always higher than for the curve 402 starting from the radius position r/R of approximately 0.39.

In order to avoid flow separation on the rotor blade 108, the blade pitch angle γ is increased. Therefore, for example, a blade pitch angle γ which is characteristic of the population with vortex generators, that is to say a blade pitch angle characteristic curve 602 or 604, is selected. The increase in the blade pitch angle leads to a reduction in the angle of attack α on the rotor blade 108 over the entire rotor radius R, so that it is ensured that the angle of attack α is in a permissible range and no flow separation occurs.

Here, the blade pitch angle preferably runs from 0° bis 90° out of a rotor plane to a wind direction which is assumed to be perpendicular to the rotor plane. An increase in the pitch angle or blade pitch angle therefore leads to the profile chord of the rotor blade turning toward the wind direction. Accordingly, an increase in the blade pitch angle leads to a reduction in the angle of attack.

However, this procedure has the disadvantage that, as a result of increasing the blade pitch angle γ of the rotor blades 108, the so-called pitching, the angles of attack α are also reduced in the outer region of the rotor blade 108, i.e., also in regions where there is typically no risk of flow separation. Therefore, on account of the pitching, the reduction in the angle of attack can lead directly to power losses of the wind power installation 100.

It is therefore proposed that the population with the vortex generators 118 is carried out in the longitudinal direction of the respective rotor blade 108 up to a radius position r/R which is determined depending on the sound power level of the wind power installation 100 to be set at the site. As a result, the described disadvantage of the power loss of the wind power installation 100 which results from the pitching can be reduced in particular. In particular, a smaller blade pitch angle γ can be set by extending the population of the rotor blade 108 with vortex generators 118 in each case.

As already discussed further above, the largest increases in the angle of attack occur in the central part of the rotor blade 108 during operation of the wind power installation 100. This is the case in particular at radius positions which are adjacent in the radial direction to the position $P_B$ of vortex generators 118 that are already fitted. In order to counter this, it is provided in the case of sound-reduced operation of the wind power installation 100 at sites with a lower sound power level to be set to extend the population of the rotor blades 108 with vortex generators 118 radially beyond the position $P_B$ up to a position $P_A$. As a result, the risk of flow separation in the central part of the rotor blade, in particular between position $P_B$ and position $P_A$, is countered.

The population of rotor blades 108 with vortex generators 118 is accompanied by a reduction in the lift-to-drag ratio in the region of the vortex generators 118, as was discussed further above. With reference to the illustration in FIG. 4, the problem of reducing the lift-to-drag ratio by population with the vortex generators 118 is explained for the operating situation in case A. By way of extending the population with vortex generators 118 up to a radius position, for example where r/R=0.39, in position $P_A$, the lift-to-drag ratio up to this position remains at a lower level than is the case in the operating situation case B. However, with suitable design, more power is again generated in the outer region of the rotor blade 108, i.e., a position with a radius position r/R>0.39, this being associated with increases in production which are then established.

Figure 5:
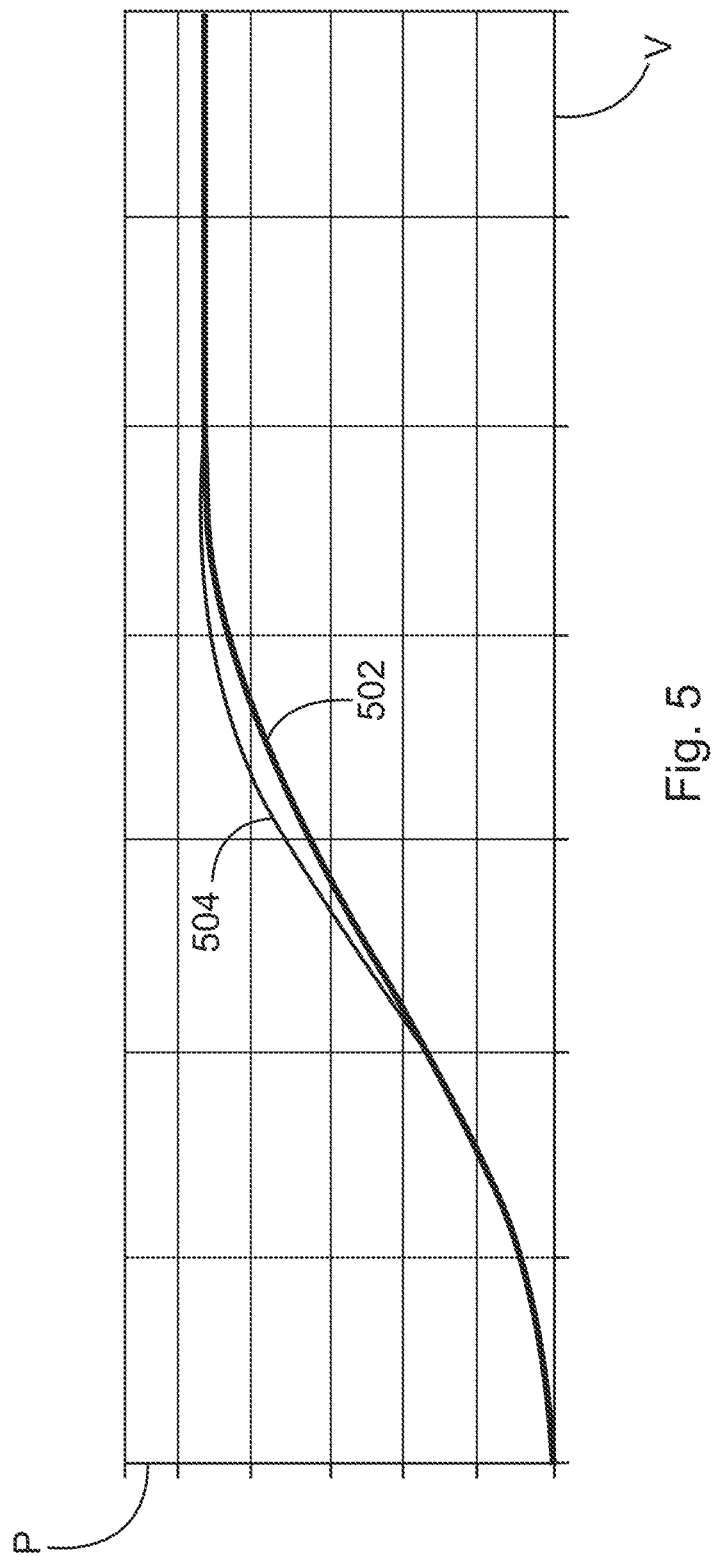
FIG. 5 shows exemplary power curves for different operating situations.

This increase in production due to increasing generation of power in the outer region of the rotor blade 108 is shown by way of example in FIG. 5. FIG. 5 shows, by way of example, different power curves 502 and 504 for operating situations case B and case A. The power curve 502 is established in case B and the power curve 504 is established in case A.

According to the power curves 504 and 502, a higher power draw can be achieved for a specific range in the part-load range of the wind speed v in case A than in case B. This increased power draw in case A leads to the production gains by way of which the increased drag in the region of the additional population by vortex generators 118 beyond position $P_B$ up to position $P_A$ can be compensated or overcompensated for.

Figure 6:
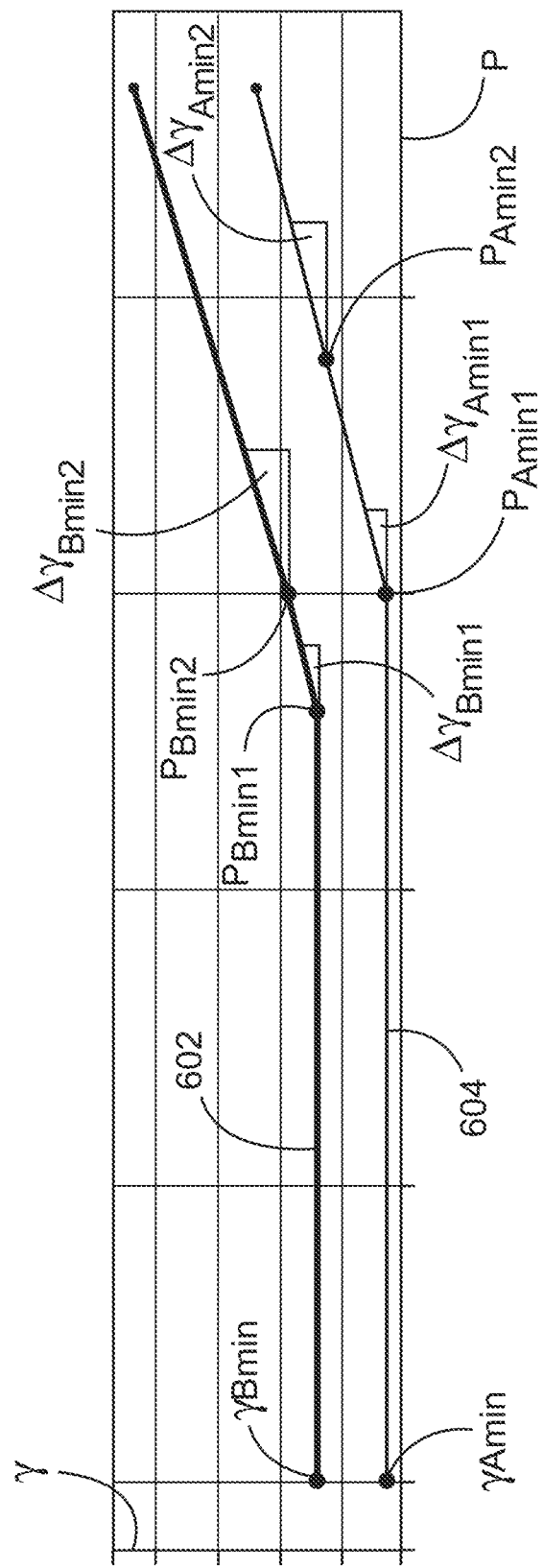
FIG. 6 shows, by way of example, two blade pitch angle characteristic curves for two different operating situations.

FIG. 6 shows, by way of example, two blade pitch angle characteristic curves 602 and 604 for two different operating situations. The blade pitch angle characteristic curve 602 is based on the operating situation in case B of control of the blade pitch angle γ. The blade pitch angle characteristic curve 604 is based on the operating situation in case A of control of the blade pitch angle γ by the control system 200, such as one or more controllers. As can be seen from curves 602 and 604, the blade pitch angle γ for case A is always smaller than the blade pitch angle γ for case B. In particular, the minimum blade pitch angle $γ_{Amin}$ is smaller than the minimum blade pitch angle $γ_{Bmin}$.

The exemplary blade pitch angle characteristic curves 602, 604 are defined as characteristic curves, defined in sections, with three linear sections in this example. Up to a first power threshold value $P_{Amin1}$ or $P_{Bmin1}$, the blade pitch angle remains at the respective minimum blade pitch angle $γ_{Amin}$ or $γ_{Bmin}$ found for the blade pitch angle characteristic curve 602, 604. Starting from this first power threshold value $P_{Amin1}$ or $P_{Bmin1}$, a blade pitch angle increase $Δγ_{Amin1}$ or $Δγ_{Bmin1}$, linear with the power, takes place until a second power threshold value $P_{Amin2}$ or $P_{Bmin2}$ is reached. Starting from this second power threshold value $P_{Amin2}$ or $P_{Bmin2}$, a blade pitch angle increase $Δγ_{Amin2}$ or $Δγ_{Bmin2}$, likewise linear with the power, takes place until the rated power is reached. The blade angle increase $Δγ_{A,Bmin2}$ may be greater than, less than or equal to the blade angle increase $Δγ_{A,Bmin1}$.

It has been found that the blade pitch angle characteristic curve for this purpose can be defined particularly successfully by the minimum blade pitch angle $γ_{min}$, a power threshold value starting from which an increase in the blade pitch angle starts and two linear regions each with a constant blade pitch angle increase adjacent thereto. It goes without saying that other functions can also be used for the blade pitch angle, for example relatively simple functions with only one single linear region of the blade pitch angle increase or more complicated functions which are, for example, not merely linear functions of the first order of the power. Here, the approach found provides a compromise, that is particularly suitable in practice, between complexity both of the optimization method and also the implementation in the control system of the wind power installation and at the same time as optimum an energy production as possible, that is to say as small a deviation as possible from an ideal blade pitch angle characteristic curve.

A further aspect takes into account that site- and operating mode-dependent rated powers $P_{rated}$ are provided for operational management for one wind power installation type. In this case, the rated power $P_{rated}$ can be adapted by adapting the rated rotor speed. Given the same power, relatively high rated rotor speeds lead to relatively high tip speed ratios in the region of the rated power $P_{rated}$ and therefore to reduced angles of attack α. The risk of flow separation is accordingly reduced. However, relatively high rated rotor speeds lead to relatively high sound power levels, so that when adapting the rated rotor speed in the case of sound power level requirements having to be satisfied at the site, the rated rotor speed has to be adapted in a corresponding manner.

Figure 7:
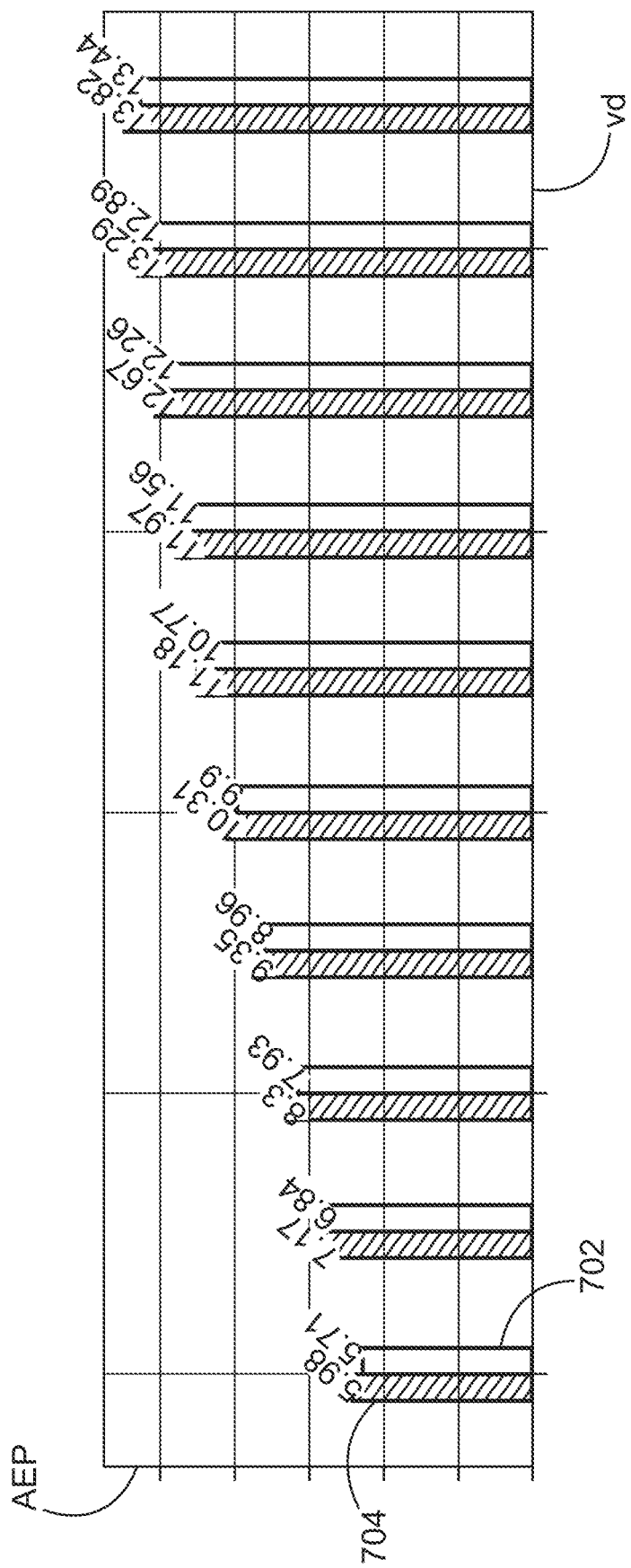
FIG. 7 shows exemplary annual energy production depending on different average wind speeds.

FIG. 7 shows annual energy production AEP illustrated using bars 702 (case B) and 704 (case A) depending on different average wind speeds vd. In case A, the annual energy production AEP for all average wind speeds vd is always higher than in case B. The combination of population of the rotor blade 108 with vortex generators 118 up to position $P_A$ and setting the blade pitch angle γ in accordance with the blade pitch angle characteristic curve 604 therefore makes it possible to achieve higher annual energy production than with site-independent population of the rotor blade 108 with vortex generators 118 up to position $P_B$ and setting of the blade pitch angle γ in accordance with the blade pitch angle characteristic curve 602 when sound power level requirements are to be complied with.

Figure 8:
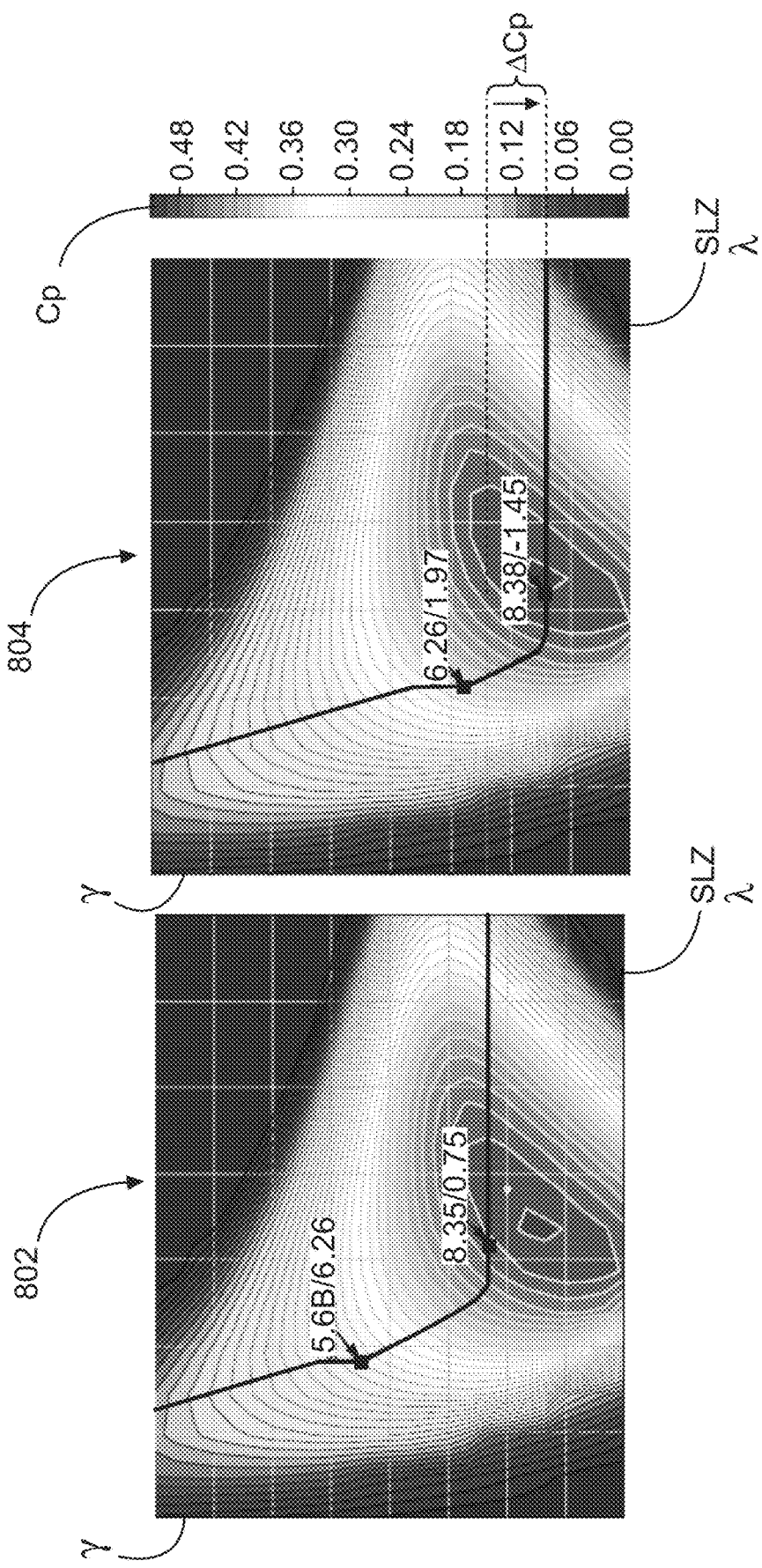
FIG. 8 shows rotor characteristic maps of the two different operating situations, which rotor characteristic maps represent a power coefficient depending on the blade pitch angle and the tip speed ratio.

FIG. 8 shows rotor characteristic maps 802 (case B) and 804 (case A) of the power coefficient depending on the blade pitch angle γ and the tip speed ratio SLZ. In case A, the wind power installation 100 can be operated with a relatively high power coefficient Cp. A power coefficient which is higher by ΔCp can be achieved in comparison to case B.

Figure 9:
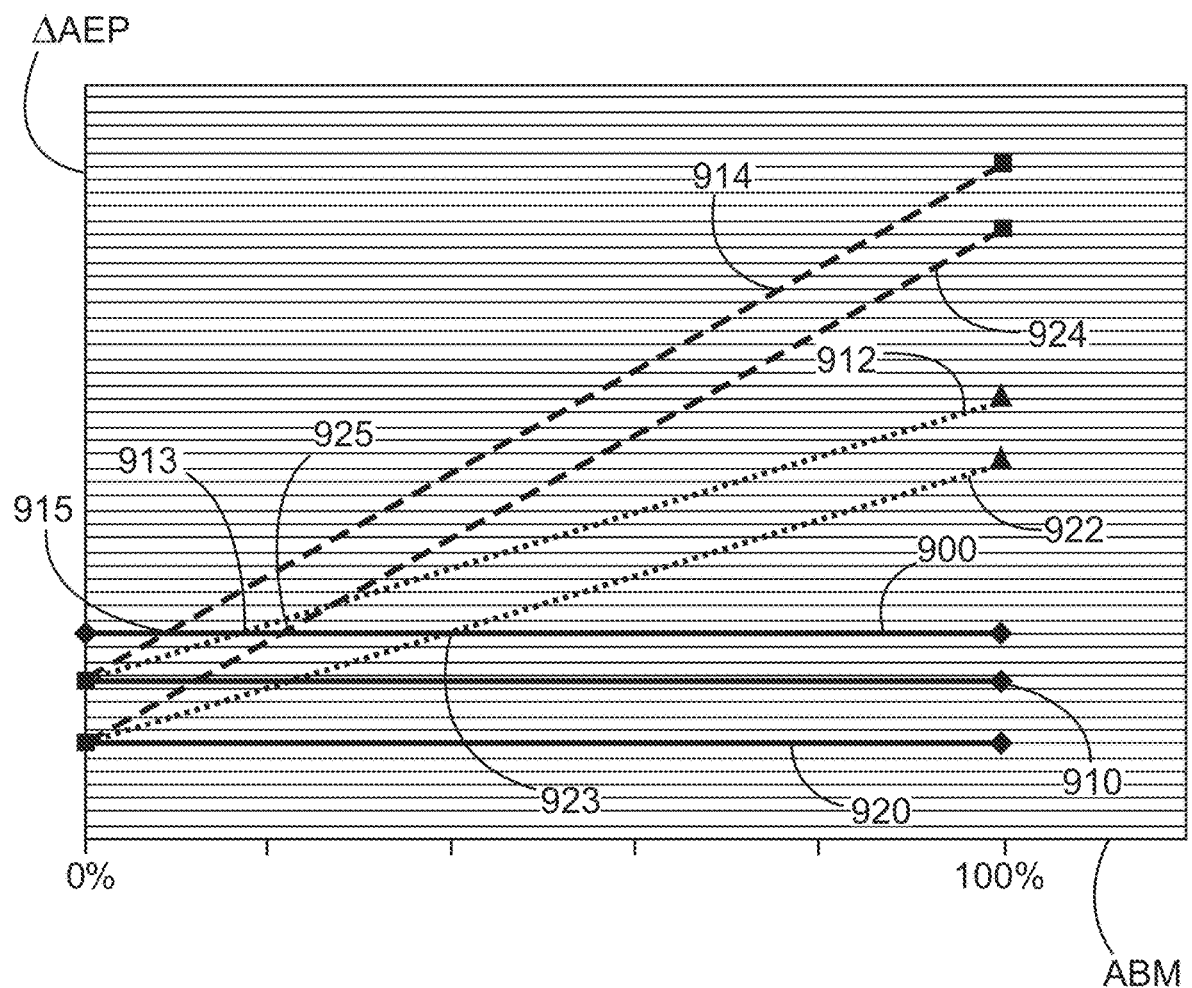
FIG. 9 shows, by way of example, differences in annual energy production depending on the proportions of a power-optimized operating mode and a sound-reduced operating mode for different operating situations.

FIG. 9 shows, by way of example, annual energy production differences ΔAEP during hybrid operation of a wind power installation depending on the proportions ABM of a power-optimized operating mode and a sound-reduced operating mode for different operating situations. The proportion of the sound-reduced operating mode lies between 0% and 100%.

A curve 900 which shows the annual energy production for a wind power installation with known population of vortex generators and known operational management is shown for reference. The further curves 910, 912, 914, 920, 922, 924 show the annual energy production differences ΔAEP relative to the curve 900, wherein, in FIG. 9, curves lying above the curve 900 indicate an increase in production and curves lying below the curve 900 indicate a reduction in production.

The curves 900, 910 and 920 represent situations in which the radius position r/R at which the population of the rotor blade with vortex generators ends successively increases, i.e., the radius position r/R at which the population of the rotor blade with vortex generators ends is greater for the curve 920 than for curve 910 and is greater for curve 910 than for curve 900. Apart from the different population with vortex generators, there are no differences between the wind power installations on which the curves 900, 910, 920 are based, that is to say operational management of the wind power installations is identical. It can be seen that the annual energy production drops independently of the proportion ABM, that is to say the extension of the population of the rotor blade in the direction of the rotor blade tip with operational management otherwise being maintained has an adverse effect on the AEP.

In the curves 912 and 922 and also 914 and 924, the operational management has been adapted in comparison to the curves 910 and 920, wherein the population of the vortex generators as in the curves 910, 920 has been maintained. The curves 912 and 922 and, respectively, 914 and 924 differ in respect of the blade pitch angle curves, examples of which are shown in FIG. 6.

The curves 912 and 922 have, for example, a common first power threshold value starting from which pitching is performed with a constant blade pitch angle rate. The curves 914 and 924 in turn have adapted operational management, for example a modified, e.g., higher, first power threshold value and a modified blade pitch angle rate. The minimum blade pitch angles between operational management systems, on which the curves 912 and 922 and, respectively, 914 and 924 are based, can also be different.

It can be seen that, for a large region of the proportion ABM of the sound-reduced operating mode, an ideal combination of population with vortex generators and also operational management exists, shown as curve 914 which provides a considerable increase in the annual energy production in comparison to the curve 900, provided that the proportion ABM exceeds a specific value. However, a further extension of the population of the vortex generators, compare curve 924, would then lead to a decline in comparison to the curve 914. It is therefore possible to find optimum population and operational management depending on the situation. As a result, the population of the rotor blade with vortex generators up to the radius position r/R and adapting the blade pitch angle and the rated rotor speed depending on a site-specific sound power level itself during hybrid operation make it possible to achieve a production gain. Here, the proportion ABM of the sound-reduced operating mode during hybrid operation may be crucial (cf. points of intersection 915, 913, 925 and 923).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind power installation for generating electrical power from wind, wherein the wind power installation has an aerodynamic rotor with a plurality of rotor blades having adjustable blade pitch angles, wherein each of the plurality of rotor blades has a rotor blade root and a rotor blade tip, the method comprising:
   determining a range of radius positions in a longitudinal direction of the respective rotor blade, wherein determining the range of the radius positions depends on a sound power level to be set at a site of the wind power installation, wherein the determining the range of the radius positions comprises determining two radius positions in the longitudinal direction of the respective rotor blade, and
   arranging a plurality of vortex generators on the respective rotor blade between the range of the radius positions in a longitudinal direction.

2. The method according to claim 1, comprising adjusting the blade pitch angles of the plurality of rotor blades depending on the sound power level to be set at the site of the wind power installation.

3. The method according to claim 2, comprising operating the wind power installation at a rated rotor speed that is reduced in comparison to a power-optimized operating mode in a sound-reduced operating mode depending on the sound power level to be set at the site of the wind power installation.

4. The method according to claim 3, wherein determining the range of the radius positions and adjusting the blade pitch angle of the respective rotor blades minimizes flow separation and power loss.

5. The method according to claim 3, wherein determining the range of the radius positions further depends on the reduced rated rotor speed.

6. The method according to claim 3, wherein the blade pitch angle of the rotor blades with which the wind power installation is operated such that, during hybrid operation containing operating time periods in the power-optimized operating mode and in the sound-reduced operating mode, production losses in the power-optimized operating mode are at least compensated for by production gains in the sound-reduced operating mode over a specific time period.

7. The method according to claim 1, wherein determining the range of the radius positions depends on the sound power level such that an increase in the blade pitch angle is minimized in the event of a reduced sound power level due to a reduction in a rated rotor speed.

8. The method according to claim 1, comprising setting the blade pitch angles for the plurality of rotor blades depending on the range of the radius positions for of the plurality of vortex generators.

9. The method according to claim 1, wherein determining the range of the radius positions further depends on a specific rated power at a site of the wind power installation.

10. The method according to claim 1, comprising:
storing a plurality of blade setting characteristic curves, and
selecting one blade setting characteristic curve from amongst the stored plurality of blade setting characteristic curves depending on the range of the radius positions determined for the plurality the vortex generators and using the one blade setting characteristic curve for setting the blade pitch angle.

11. The method according to claim 1, wherein the range of the radius positions in the longitudinal direction of the respective rotor blade further depends on a proportion of a sound-reduced operating mode at a site of the wind power installation.

12. The method according to claim 11, further comprising determining the blade pitch angle based on the proportion of the sound-reduced operating mode at the site of the wind power installation.

13. The method according to claim 1, wherein arranging the plurality of vortex generators on the respective rotor blade includes linearly arranging the plurality of vortex generators on the respective rotor blade.

14. A rotor blade comprising:
a body extending from a rotor blade root to a rotor blade tip and having a suction side, a pressure side, and a plurality of vortex generators, wherein the plurality of vortex generators is arranged at least on the suction side between the rotor blade root and the rotor blade tip, wherein the plurality of vortex generators is arranged in a longitudinal direction of the rotor blade between a range of radius positions, wherein the range of radius positions is in dependence on a preset site-specific sound power level, wherein the range of the radius positions is two radius positions in the longitudinal direction of the respective rotor blade.

15. The rotor blade according to claim 14, wherein the plurality of vortex generators are arranged starting from the rotor blade root, in a direction of the rotor blade tip, up to the radius position of the rotor blade such that, during sound-reduced operation at a rated rotor speed that is reduced in comparison to power-optimized operation and with setting of a blade pitch angle of the rotor blade matched to the arrangement of the plurality of vortex generators, a flow separation reduced rated rotor speed is prevented, and thereby minimizing a power loss.

16. A wind power installation comprising:
an aerodynamic rotor with a plurality of rotor blades of which blade pitch angles are configured to be adjusted, wherein the aerodynamic rotor is configured to be operated in a respective operating mode at a respective settable rated rotor speed, and
a control system, wherein the control system is configured to operate the wind power installation using the method according to claim 1.

17. The wind power installation according to claim 16, wherein at least one rotor blade of the plurality of rotor blades has a rotor blade root, a rotor blade tip, a suction side, a pressure side, and a plurality of vortex generators, wherein the plurality of vortex generators is arranged at least on the suction side between the rotor blade root and the rotor blade tip, wherein the plurality of vortex generators is arranged on the respective rotor blade in a longitudinal direction in a range of radius positions in dependence on a site-specific sound power level to be set.

18. A wind farm comprising:
a plurality of wind power installations, wherein at least one wind power installation of the plurality of installations is the wind power installation according to claim 16.

* * * * *